United States Patent [19]

Tsutsumi

[11] 4,286,561
[45] Sep. 1, 1981

[54] INTERNAL COMBUSTION ENGINE INTAKE SYSTEM HAVING JET-PRODUCING NOZZLE IN INTAKE PORT

[75] Inventor: Saburo Tsutsumi, Yokohama, Japan

[73] Assignee: Nissan Motor Company, Limited, Yokohama, Japan

[21] Appl. No.: 961,924

[22] Filed: Nov. 20, 1978

[30] Foreign Application Priority Data

Nov. 21, 1977 [JP] Japan .................. 52-155360[U]

[51] Int. Cl.³ ............................................... F01N 3/10
[52] U.S. Cl. ....................................... 123/432; 123/308
[58] Field of Search ............ 123/119 D, 124 R, 75 B, 123/26, 306, 308, 432; 261/63 A

[56] References Cited

U.S. PATENT DOCUMENTS

| | | | |
|---|---|---|---|
| 2,152,028 | 3/1939 | Church | 123/124 R |
| 3,331,361 | 7/1967 | Baudry | 123/75 B |
| 3,408,992 | 11/1968 | Seggern | 123/75 B |
| 3,678,905 | 7/1972 | Diehl | 123/75 B |
| 3,688,752 | 9/1972 | Baudry | 123/124 R |
| 3,977,188 | 8/1976 | Arnaud | 123/432 |
| 4,064,849 | 12/1977 | Nagasawa | 123/75 B |
| 4,133,322 | 1/1979 | Nakamura | 123/124 R |
| 4,184,328 | 1/1980 | Rezy | 123/188 GC |

Primary Examiner—Ronald H. Lazarus

[57] ABSTRACT

An extra induction passage extends to an intake port for each combustion chamber to induct air, fuel or recirculated exhaust gas by utilizing vacuum in the intake port. This passage terminates at a jet-producing nozzle which is located near the end of a valve guide for an ordinary intake valve and directed towards a peripheral region of the inlet opening of the combustion chamber. Preferably, the extra induction passage extends outside of the valve guide, and a valve which acts in synchronism with the intake valve is provided to this passage or the nozzle. A gas jet from the nozzle, particularly under low-load conditions, promotes homogenization of a combustible gas mixture and causes a turbulent or swirling motion of the mixture in the combustion chamber, so that combustion proceeds rapidly and smoothly even though the mixture comprises large excess air or large amount of exhaust gas.

7 Claims, 9 Drawing Figures

INTERNAL COMBUSTION ENGINE INTAKE SYSTEM HAVING JET-PRODUCING NOZZLE IN INTAKE PORT

BACKGROUND OF THE INVENTION

This invention relates to an internal combustion engine intake system, and more particularly to an intake system comprising an extra induction passage which terminates at a jet-producing nozzle opening into an intake port portion of a usual induction passage with a view of effecting improvements on combustion characteristics.

In current internal combustion engines, particularly in automotive engines, it is familiar to employ a considerably lean mixture with the object of reducing the emission of HC, CO and NOx all together or to recirculate a portion of the exhaust gas through the combustion chambers in order to suppress the formation of NOx. In either case, however, there is a strong tendency that the combustion in the engine becomes less stable and less efficient with the result that the engine operates unstably in certain ranges of practical operation conditions. Generally, it is necessary to feed the engine operating under low-load conditions or idling with a rich mixture (also at cold starting of the engine), though this brings about a difficulty in reducing the emission of HC and CO, because combustion becomes unstable under such operating conditions.

For these and other reasons, it is impermissible to optionally prescribe either the air-fuel ratio or the rate of exhaust gas recirculation solely with a view to attaining success in emission control. It is a requisite to give a careful consideration to the unfavorable influence of raising the air-fuel ratio or augmenting the exhaust gas recirculation on the stableness of combustion thereby to maintain the engine performance on a satisfactory level. However, this requirement has imposed limitations to the emission control by a relatively simple measure such as the adoption of a lean mixture or the recirculation of exhaust gas.

SUMMARY OF THE INVENTION

It is an object of the present invention to produce improvements on combustion characteristics in an internal combustion engine, particularly under low-load operating conditions, thereby to lighten limitations to the adoption of a lean mixture and the recirculation of exhaust gas.

More particularly, it is an object of the invention to provide an internal combustion engine intake system which comprises an extra induction passage extending to a nozzle to produce a gas jet effective in promoting homogenization and turbulent flow of a gas mixture admitted into each combustion chamber and accordingly improving the stability of combustion.

An intake system according to the invention has an induction passage, an intake port as an endmost portion of the induction passage adjoining a combustion chamber of the engine, a throttle valve installed in the induction passage upstream of the intake port, an intake valve for periodically establishing communication between the intake port and the combustion chamber according to the engine cycle, and a fuel nozzle opening into the induction passage at a section upstream of the intake valve. The intake valve has a stem which extends through the intake port and slidably passes through a cylindrical valve guide fixedly inserted into a cylinder head. These elements are all constructed and arranged in the usual manner. As a novel feature, this intake system comprises an extra or auxiliary induction passage arranged to induct a gas into the intake port by the action of vacuum created in the intake port. At least a terminal portion of this passage is formed in the cylinder head, and the system further comprises a nozzle which serves as the terminal of the auxiliary induction passage and opens into the intake port at a location close to an end of the valve guide to jet the aforementioned gas into the intake port.

The gas inducted through the auxiliary induction passage may be air, an air-fuel mixture or exhaust gas recirculated from the exhaust line of the engine.

A gas jet from the nozzle according to the invention acquires a high velocity while the engine operates under low-load conditions and accordingly can vigorously agitate a gas mixture being admitted into the combustion chamber, so that the mixture undergoes combustion in a homogenized and turbulent or swirling state. The combustion, therefore, proceeds rapidly and smoothly even in the case of a very lean mixture or an air-fuel mixture diluted with a large amount of recirculated exhaust gas.

It is preferable that the auxiliary induction passage does not extend through the inside of the valve guide, and it is also preferable that the auxiliary induction passage or the jet-producing nozzle is provided with a valve which acts in synchronism with the intake valve.

DESCRIPTION OF THE PREFERRED EMBODIMENT

Figure 1:
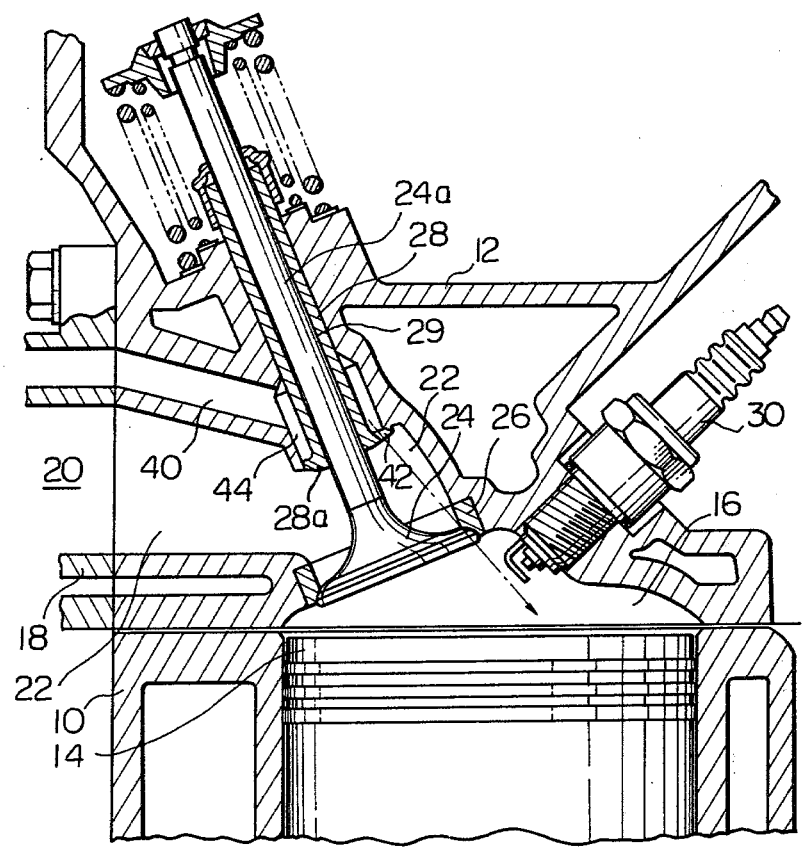
FIG. 1 shows, in section, a portion of an internal combustion engine intake system as an embodiment of the invention.
Figure 2:
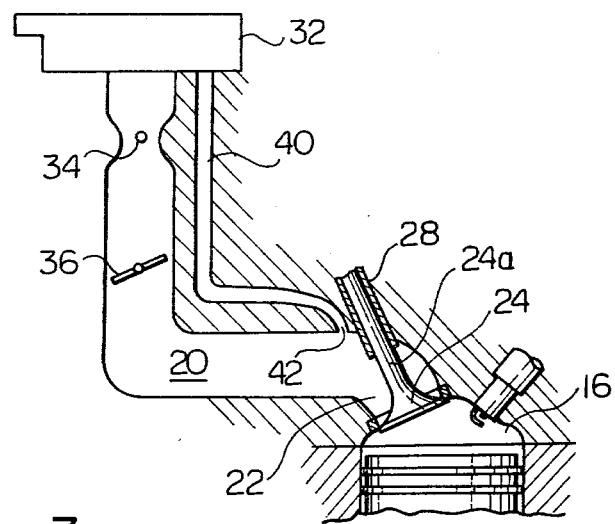
FIG. 2 shows schematically a general construction of the intake system of FIG. 1.

Referring to FIGS. 1 and 2, an internal combustion engine comprises an assembly of a cylinder block 10, a cylinder head 12 and a piston 14 received in a bore of the cylinder block 10 in the usual manner. The bottom face of the cylinder head 12 is recessed so as to provide a combustion chamber 16. Through an intake manifold 18, an induction passage 20 extends to the combustion chamber 16 with the provision of an intake valve 24, a familiar poppet valve, to govern the communication of the combustion chamber 16 with the induction passage 20. Indicated at 26 is an annular valve seat for the intake valve 24. The stem 24a of the intake valve 24 fits slidably into a cylindrical valve guide 28 inserted into the cylinder head 12. Indicated at 30 is a spark plug for the combustion chamber 16. A terminal portion 22 (close to the valve seat 26) of the induction passage 20 will be referred to as an intake port 22. In other words, the intake port 22 is a gas passage formed in the cylinder head 12 to establish communication between the intake manifold 18 and the combustion chamber 16. The induction passage 20 extends from an air cleaner 32. An intermediate section of the induction passage 20 constitutes a venturi section of a carburetor (not indicated), and a fuel nozzle 34 opens into this section 32. A main throttle valve 36 is located downstream of the fuel nozzle 34. In these respects, the illustrated intake system is of a known construction.

As a novel feature of this intake system, a gas passage 40 in the form of a continuous bore through the bodies of the intake manifold 18 and the cylinder head 12 extends from the air cleaner 32 to the intake port 22 so as to bypass the throttle valve 36. Accordingly this gas passage 40 serves as an extra induction passage but is smaller in cross-sectional area than the main induction passage 20. More in detail, the gas passage 40 terminates at a nozzle 42 which opens into the intake port 22. This nozzle 42 is so shaped, located and oriented as to induct a gas (air in this case) into the intake port 22 as a jet directed toward a selected region of the annular valve face of the intake valve 24. In the embodiment illustrated in FIG. 1, an annular space 44 formed around an endmost portion of the valve guide 28 serves as a terminal portion, i.e. a portion adjacent the nozzle 42, of the gas passage 40. In this case, a bore 29 in the cylinder head 12 for the installation of the valve guide 28 is made to have an enlarged diameter in its endmost portion adjoining the intake port 22, and the valve guide 28 is formed with a flange 28a at one end tp be exposed to the intake port 22. The diameter of this flange 28a corresponds to that of the enlarged portion of the bore 29. When the valve guide 28 is inserted tightly into the bore 29 such that the mouth of the bore 29 is closed by the flange 28a, the enlarged portion of the bore 29 provides the aforementioned annular passage 44 around the outer surface of an end portion of the valve guide 28. The nozzle 42 is formed by holing the flange 28a of the valve guide 28 thus installed, usually accompanied with grooving of an inner wall face of the cylinder head 12 (because the direction of the nozzle 42 is not parallel to the longitudinal axis of the valve guide 28). Accordingly the annular passage 44 always communicates with the intake port 22 through the nozzle 42.

During operation of the engine, a vacuum is created in the induction passage 20 downstream of the throttle valve 36, i.e. in the intake manifold 22, and the magnitude of this vacuum (intake vacuum) augments as the load on the engine lowers. Under low-load operating conditions of the engine, therefore, a considerable quantity of air is sucked into the intake port 22 through the gas passage 40 which bypasses the throttle valve 36 and opens to the atmosphere. Because of the provision of the nozzle 42, air sucked through the passage 40 enters the intake port 22 as a high velocity jet. As a consequence, a violently turbulent flow is produced in the intake port 22 and, also, in the combustion chamber 16.

While the intake valve 24 remains closed, a turbulent flow produced in the intake port 22 by the jet of air has the effect of promoting homogenization of a combustible mixture through forcible mixing. When the intake valve 24 is opened, the jet of air from the nozzle 42 intrudes into the combustion chamber 16 through the opening between the valve seat 26 and the head of the intake valve 24, whereby the gas mixture admitted into the combustion chamber 16 continues flowing vigorously and turbulently. Accordingly homogenization of the mixture in the combustion chamber 16 still nears thoroughness during intake stroke. The effect of the air jet from the nozzle 42 remains even after closing of the intake valve 24, i.e. during compression stroke. Moreover, the mixture undergoes combustion (power stroke) with the maintenance of turbulence due to the inertia of the flowing mixture, so that flame propagation in the combustion chamber 16 is greatly promoted. Such a process results in that the rate of combustion rises considerably and that the combustion proceeds with improved stability.

Preferably, the nozzle 42 is directed so as to assist the gas mixture swirling in the combustion chamber 16. By locating the nozzle 42 close to the combustion chamber 16, i.e. close to the valve seat 26, the effects of the air jet from the nozzle 42 on the mixture in the combustion chamber 16, promoting homogenization of the mixture and causing a turbulent or swirling flow, can be enhanced and made to persist during compression stroke until near top dead center.

On account of a remarkably improved stability of combustion by the introduction of air into the combustion chamber 16 through the bypass passage 40 and the nozzle 42, it becomes easy and fully practicable to operate the engine with a very lean mixture (as the mixture inducted through the main induction passage 20, i.e. through the intake manifold 18) even under low-load conditions or to augment the recirculation of exhaust gas. It becomes possible, therefore, to realize an advanced level of emission control.

Figure 3:
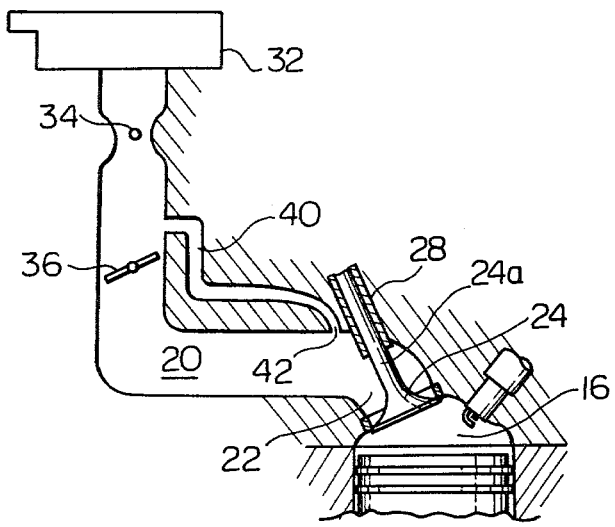
FIG. 3 shows a slight modification of the intake system of FIG. 2.

In the above described embodiment the gas passage 40 is arranged so as to pass air from the air cleaner 32 to the nozzle 42. However, the object of the invention is fully accomplished also by jetting an air-fuel mixture into the intake port 22 from the nozzle 42 arranged according to the foregoing description. In this case, as shown in FIG. 3, the gas passage 40 is made to branch from the main induction passage 20 at a section downstream from the fuel nozzle 34 but a little upstream of the throttle valve 36. The jetting of an air-fuel mixture, instead of air, from the nozzle 42 is more advantageous for thorough homogenization of the mixture admitted into the combustion chamber 16 and accordingly is more effective in improving combustion characteristics.

Figure 4:
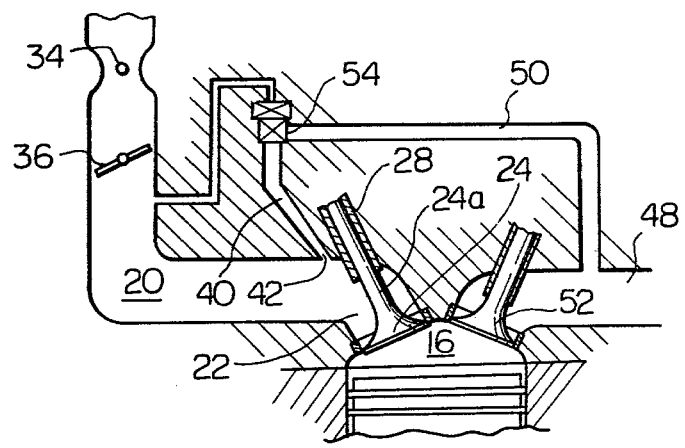
FIG. 4 shows schematically a general construction of an internal combustion engine intake system as another embodiment of the invention.

Still alternatively, when the engine is subjected to exhaust gas recirculation the gas passage 40 may be arranged as a terminal portion of an exhaust gas recirculation passage. In FIG. 4, an exhaust gas recirculation passage 50 branches from an exhaust passage 48 for the engine, and the gas passage 40 according to the invention (which terminates at the above described nozzle 42) is arranged to serve as a terminal portion of the exhaust gas recirculation passage 50. Indicated at 52 is a usual exhaust valve for the combustion chamber 16. The exhaust gas recirculation passage 50 is usually provided with a flow control valve 54 which may be of a vacuum operated type utilizing intake vacuum. Then, a passage extending from the control valve 54 to the nozzle 42 is regarded as the gas passage 40 according to the invention. The recirculated exhaust gas enters the intake port 22 as a jet from the nozzle 42 and accordingly blends soon and well with the air-fuel mixture inducted through the induction passage 20. Furthermore, the jet of the recirculated exhaust gas causes a rise in the rate of combustion of the mixture admitted into the combustion chamber 16 as described hereinbefore with regard to the jetting of air. Therefore, it becomes possible to augment the recirculation of exhaust gas with the maintenance of the stability of combustion.

A terminal portion of the gas passage 40 in the cylinder head 12 and the nozzle 42 may be designed in various ways. However, it is convenient and preferable that the nozzle 42 is located near the valve seat 26 because a gas jet from the nozzle 42 should be directed to the combustion chamber 16 through an annular clearance between the valve seat 26 and the head of the intake valve 24 in an open state. When the distance between the nozzle 42 and the valve guide 28 is substantially zero as in the case of FIG. 1, the provision of the annular passage 44 around the valve guide 28 is favorable to a smooth flow of the inducted gas to the nozzle 42. To provide the annular passage 44, the outside of the valve guide 28 may be cut or grooved to a certain extent. However, it is preferable that the annular passage 44, or any other portion of the gas passage 40, does not reach the inside of the valve guide 28. If the passage 40 is so designed as to extend through the inside of the valve guide 28 (by radially holing the valve guide 28 and cutting or grooving the inside of the valve guide 28), the valve stem 24a may be impeded in its sliding movement relative to the valve guide 28 and/or may be significantly worn out on account of clogging with foreign matter contained in the gas introduced through the passage 40.

Figure 5:
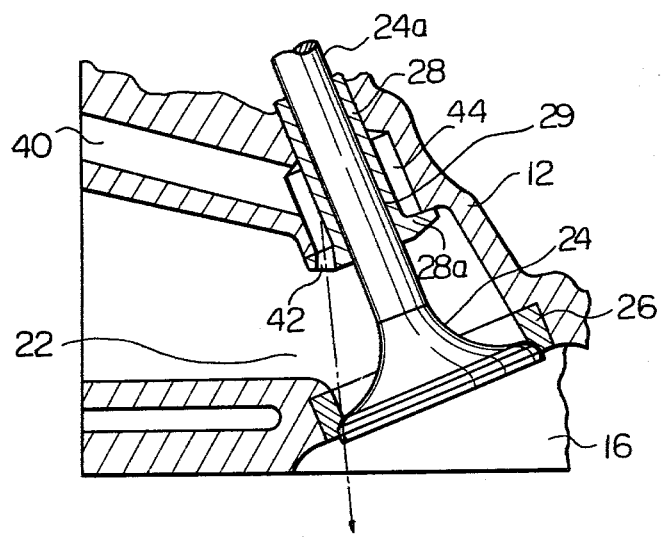
FIGS. 5–7 respectively show three variations of the arrangement of an endmost portion of a gas passage included in the system of FIG. 1.

In FIG. 5, the annular passage 44 and the nozzle 42 are provided generally similarly to those in FIG. 1, but in this case the nozzle 42 is located such that the gas jet enters a peripheral region of the combustion chamber 16 when the intake valve 24 is opened.

Figure 6:
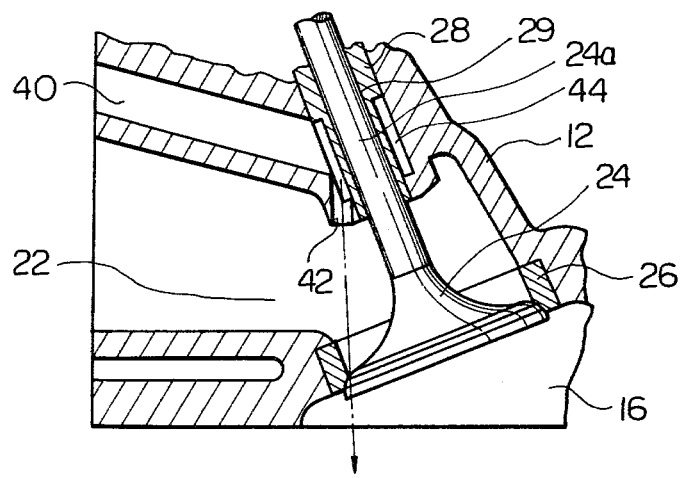

As shown in FIG. 6, the annular passage 44 around the valve guide 28 may be formed also by reducing the outer diameter of an end portion of the valve guide 28 instead of enlarging the diameter of the bore 29 and forming the flange 28a at the end of the valve guide 28 as in the embodiments of FIGS. 1 and 5.

Figure 7:
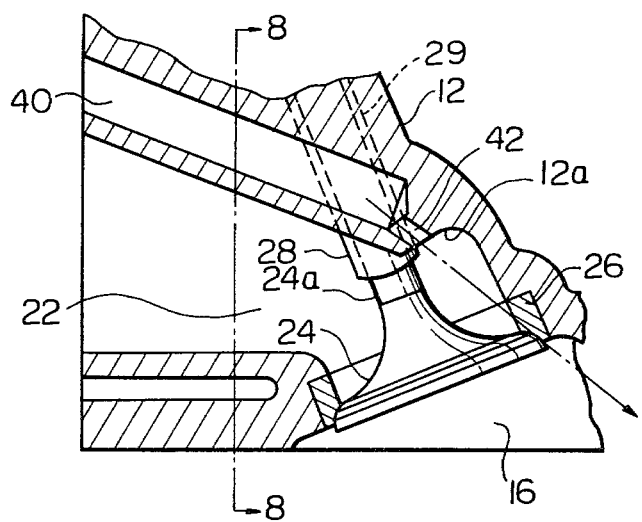
Figure 8:
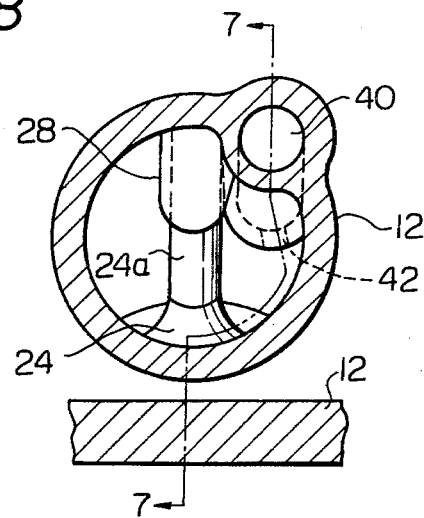
FIG. 8 is a sectional view taken along the line 8—8 of FIG. 7.

FIGS. 7 and 8 show another variation of the arrangement of the gas passage 40 and the nozzle 42. In this case a terminal portion of the gas passage 40 is formed in the body of the cylinder head 12 so as not to intersect the bore 29 for installation of the valve guide 28. Without circling around the valve guide 28, the passage 40 terminates at a short distance from a wall face 12a defining the intake port 22 in a region near the lower end of the valve guide 28. The nozzle 42 is provided by boring the cylinder head 12 so as to open on the wall face 12a. As demonstrated by this embodiment, it is not a requisite that the gas passage 40 comprises an annular passage as an endmost portion adjacent the nozzle 42. It will be apparent that the passage 40 and nozzle 42 in FIGS. 7 and 8 produce the same effect as ones in FIG. 1 do. In practical applications, the embodiment of FIGS. 7 and 8 has the advantage that the nozzle 42 and a terminal portion of the passage 40 can be formed by machining the cylinder head 12 alone with no need for any modification of the valve guide 28.

In any case it is preferable that the nozzle 42 has such an effective cross-sectional area that the quantity of a gas jetted from the nozzle 42 is in the range from about 10% to about 50% of the total quantity of a gas mixture to be admitted into the combustion chamber 16 (determined by the maximum volume of the combustion chamber 16).

In the foregoing embodiments, a gas is continously jetted from the nozzle 42 into the intake port 22. However, the effect of the gas jet can be enhanced by effecting the jetting only during each intake stroke. From this viewpoint, the gas passage 40, or the nozzle 42, is preferably provided with a valve which opens simultaneously with the intake valve 24. To the provision of such a valve, it is convenient that the gas passage 40 includes the annular passage 44 around the valve guide 28 as shown in FIGS. 1, 5 and 6.

Figure 9:
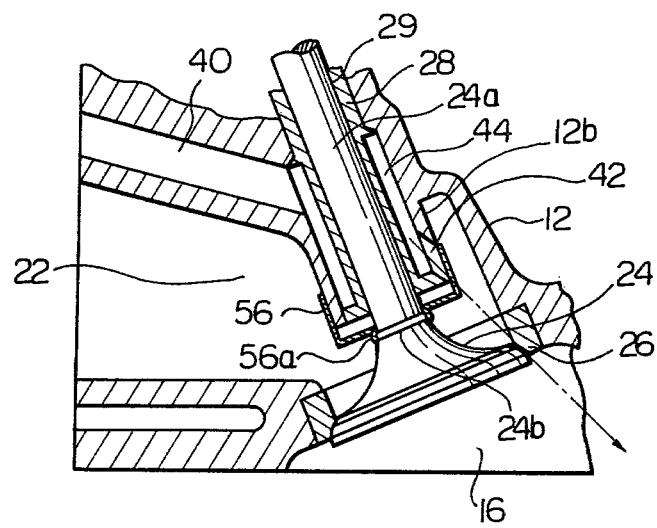
FIG. 9 shows the addition of a valve means to the gas passage shown in FIG. 1 as a still different embodiment of the invention.

By way of example, FIG. 9 shows the provision of a valve to the combination of the gas passage 40 and the nozzle 42 arranged fundamentally as in the embodiment of FIG. 1. The cylinder head 12 is formed with a cylindrical surface 12b around an endmost portion of the valve guide 28, and the nozzle 42 is made to open on this surface 12b. A valve 56 in the form of a cylindrical or cup-shaped cover with an inner diameter fitted to the diameter of the cylindrical surface 12b is secured to the stem 24a of the intake valve 24 at a location outside of and, when the intake valve 24 is in the closed state, very close to the lower end of the valve guide 28. The position of the nozzle 42 and the length of the cover 56 are determined such that the nozzle 42 is completely closed by the cover 56 while the intake valve 24 remains closed but opens to the intake port 22 when the intake valve 24 is opened. In the illustrated case, the valve stem 24a is formed with an annular ridge 24b while the cylindrical cover 56 is formed with an annular detent 56a which may have longitudinal slits to exhibit resiliency, so that the cover 56 is secured to the valve stem 24a by fitting the cover 56 around the valve stem 24a (before insertion into the valve guide 28) from its upper end and bringing down the cover 56 until the detent 56a comes into engagement with the ridge 24b of the valve stem 24a. Of course, the cover 56 may be fixed to the valve stem 24a by any other method and may even be made as an integral part of the valve stem 24a. By fixing the cover or valve 56 to the valve stem 24a, the valve 56 can be moved in exact synchronism with the intake valve 24. Accordingly, jetting of a gas from the nozzle 42 is interrupted while the intake valve 24 remains in the closed state, but when the intake valve 24 is opened a gas is jetted powerfully from the nozzle 42 towards the combustion chamber 16.

By allowing the nozzle 42 to serve its function only while the intake valve 24 is open, it becomes possible to admit an increased quantity of a gas as a jet from the nozzle 42 into the combustion chamber 16 within a short period of time. Then a further promotion of combustion is realizable since the powerful gas jet exhibits less attenuation before power stroke and further intensifies turbulent or swirling motion of the mixture in the combustion chamber 16. Compared with continuous gas-jetting from the nozzle 42, the intermittent jetting in synchronism with the action of the intake valve 24 is advantageous in that the energy of the jetted gas is concentratedly utilized at the most effective timing for intensifying and long maintaining turbulent or swirling motion of the mixture subjected to combustion. Accordingly the provision of a valve means of the above described function to the nozzle 42, or to the gas passage 40, is quite favorable to the stabilization of combustion, improvement on the fuel economy and advancement of emission control through extension of the lean mixture limit or the exhaust gas recirculation limit.

As will be understood from the foregoing description of the preferred embodiments, an intake system according to the invention is so constructed as to vigorously agitate and well blend a gas mixture being introduced into the combustion chamber by means of a gas jet which acquires a high velocity while the engine is idling or operating under part-load to medium-load conditions. Accordingly, almost ideal homogenization of the essential components of the gas mixture, i.e. air and fuel sometimes with the addition of recirculated exhaust gas, can be accomplished immediately before ignition of the mixture, and the homogenized mixture undergoes combustion while the mixture makes a violently turbulent or swirling motion in the combustion chamber, with the result that flame propagation in the combustion chamber is greatly promoted and, hence, that the combustion proceeds rapidly and smoothly. Owing to such improvements on the combustion characteristics, it becomes possible to increase the amount of exhaust gas recirculated to lessen the formation of NOx or to employ a sufficiently lean mixture to lessen the emission of HC and CO without suffering from deterioration of the essential performance of the engine. Furthermore, this intake system brings about improved fuel economy and facilitates cold-starting of the engine.

It is also an advantage of the invention that the extra induction passage and the jet-producing nozzle can be formed easily in the cylinder head with no influence on the construction and function of the intake valve.

What is claimed is:

1. An intake system of an intenal combustion engine, comprising: an induction passage, an intake port as an endmost portion of said induction passage adjoining a combustion chamber of the engine, a throttle valve installed in said induction passage upstream of said intake port, an intake valve for periodically establishing communication between said intake port and said combustion chamber according to the engine cycle, said intake valve having a stem extending through said intake port and slidably passing through a cylindrical valve guide fixedly inserted into a cylinder head, a fuel nozzle opening into said induction passage at a section upstream of said intake valve, an auxiliary induction passage arranged to induct a gas into said intake port by the action of vacuum created in said intake port, at least a terminal portion of said auxiliary induction passage being formed in said cylinder head, said guide member defining a nozzle which serves as the terminal of said auxiliary induction passage and as a valve member for controlling admission of auxiliary gas and opens into said intake port at a location close to an end of said valve guide to jet said gas into said intake port in a direction towards said combustion chamber, said auxiliary induction passage extending to said nozzle without entering the inside of said valve guide, an endmost portion, which is adjacent said nozzle, of said terminal portion of said auxiliary induction passage being in the form of a generally annular passage the inside of which is defined by a cylindrical outer surface of said valve guide, upstream of said generally annular passage said auxiliary induction passage being distant from said valve guide.

2. An intake system as claimed in claim 1, wherein said nozzle is directed towards a peripheral region of the inlet opening of said combustion chamber provided with said intake valve.

3. An intake system according to claim 1, wherein said nozzle is directed such that said gas jetted from said nozzle assists a gas mixture admitted into said combustion chamber in swirling in said combustion chamber.

4. An intake system according to claim 1, wherein said gas is air, said auxiliary induction passage bypassing said throttle valve and said fuel nozzle and opening into the atmosphere.

5. An intake system according to claim 1, wherein said gas is an air-fuel mixture, said fuel nozzle being located upstream of said throttle valve, said auxiliary induction passage branching from said induction passage at a section between said fuel nozzle and said throttle valve.

6. An intake system according to claim 1, wherein said gas is the exhaust gas of the engine, said auxiliary induction passage being connected to an exhaust passage of the engine.

7. An intake system of an internal combustion engine, comprising: an induction passage; an intake port as an endmost portion of said induction passage adjoining a combustion chamber of the engine; a throttle valve installed in said induction passage upstream of said intake port; an intake valve for periodically establishing communication between said intake port and said combustion chamber according to the engine cycle, said intake valve having a stem extending through said intake port and slidably passing through a cylindrical valve guide fixedly inserted into a cylinder head; a fuel nozzle opening into said induction passage at a section upstream of said intake valve; an auxiliary induction passage arranged to induct a gas into said intake port by the action of vacuum created in said intake port, at least a terminal portion of said auxiliary induction passage being formed in said cylinder head; a nozzle which serves as the terminal of said auxiliary induction passage and opens into said intake port at a location close to an end of said valve guide to jet said gas into said intake port in a direction towards said combustion chamber, said auxiliary induction passage extending to said nozzle without entering the inside of said valve guide, an endmost portion, which is adjacent said nozzle, of said terminal portion of said auxiliary induction passage being in the form of a generally annular passage which is defined between a cylndrical outer surface of said valve guide and a cylindrical inner surface of a cylindrical wall portion of said cylinder head projecting into said intake port substantially concentrically with said valve guide, said nozzle being formed in said cylindrical wall portion, upstream of said generally annular passage said auxiliary induction passage being distant from said valve guide; and a valve means for blocking the communication of said auxiliary induction passage with said intake port through said nozzle while said intake valve remains closed, said valve means comprising a valve member which is fixed to said stem of said intake valve in an endmost portion always remaining outside said valve guide and has a cylindrical portion which is slidably fittable around the outer surface of said cylindrical wall portion such that said nozzle is closed by said cylindrical portion of said valve member while said intake valve remains closed.

* * * * *